(12) United States Patent
Adams

(10) Patent No.: US 8,016,274 B2
(45) Date of Patent: Sep. 13, 2011

(54) ANTIVIBRATION DEVICE, AND VEHICLE COMPRISING SAME

(75) Inventor: Blake Adams, Comstock Park, MI (US)

(73) Assignee: Paulstra CRC, Grand Rapids, MI (US)

( * ) Notice: Subject to any disclaimer, the term of this patent is extended or adjusted under 35 U.S.C. 154(b) by 811 days.

(21) Appl. No.: 11/861,785

(22) Filed: Sep. 26, 2007

(65) Prior Publication Data
US 2009/0079117 A1      Mar. 26, 2009

(51) Int. Cl.
*F16F 5/00*      (2006.01)

(52) U.S. Cl. ..................... 267/140.13; 248/562

(58) Field of Classification Search ............ 267/140.11–140.15, 219; 248/550, 248/562, 566, 636, 638
See application file for complete search history.

(56) References Cited

U.S. PATENT DOCUMENTS

| | | | |
|---|---|---|---|
| 4,653,734 A | 3/1987 | Jördens | |
| 5,213,315 A | 5/1993 | Härtel et al. | |
| 5,632,472 A * | 5/1997 | Kato et al. | 267/140.13 |
| 5,810,336 A * | 9/1998 | Gennesseaux | 267/140.14 |
| 6,386,527 B2 * | 5/2002 | Oberle | 267/140.14 |
| 7,448,605 B2 * | 11/2008 | Bretaudeau et al. | 267/140.14 |

FOREIGN PATENT DOCUMENTS

| | | |
|---|---|---|
| DE | 39 13 819 | 10/1990 |
| DE | 41 39 046 | 6/1993 |
| EP | 0 149 080 | 7/1985 |
| EP | 0 480 460 | 4/1992 |
| EP | 1 961 991 | 8/2008 |

OTHER PUBLICATIONS

European Search Report from European counterpart application No. EP 08 16 4728; Report dated Nov. 12, 2008.

* cited by examiner

*Primary Examiner* — Melanie Torres Williams
(74) *Attorney, Agent, or Firm* — Miller, Matthias & Hull, LLP

(57) ABSTRACT

An antivibration device for supporting loads and damping vibration between external elements. The antivibration device comprises two rigid members and a resilient body for supporting loads and partially damping vibrations The antivibration device also comprises a damping unit for further damping of vibrations coincidentally with the resilient body. The antivibration also has an inhibitor apparatus which may be operated to drive the damping unit between two positions to selectively allow the transmission of loads and vibrations to the damping unit.

15 Claims, 5 Drawing Sheets

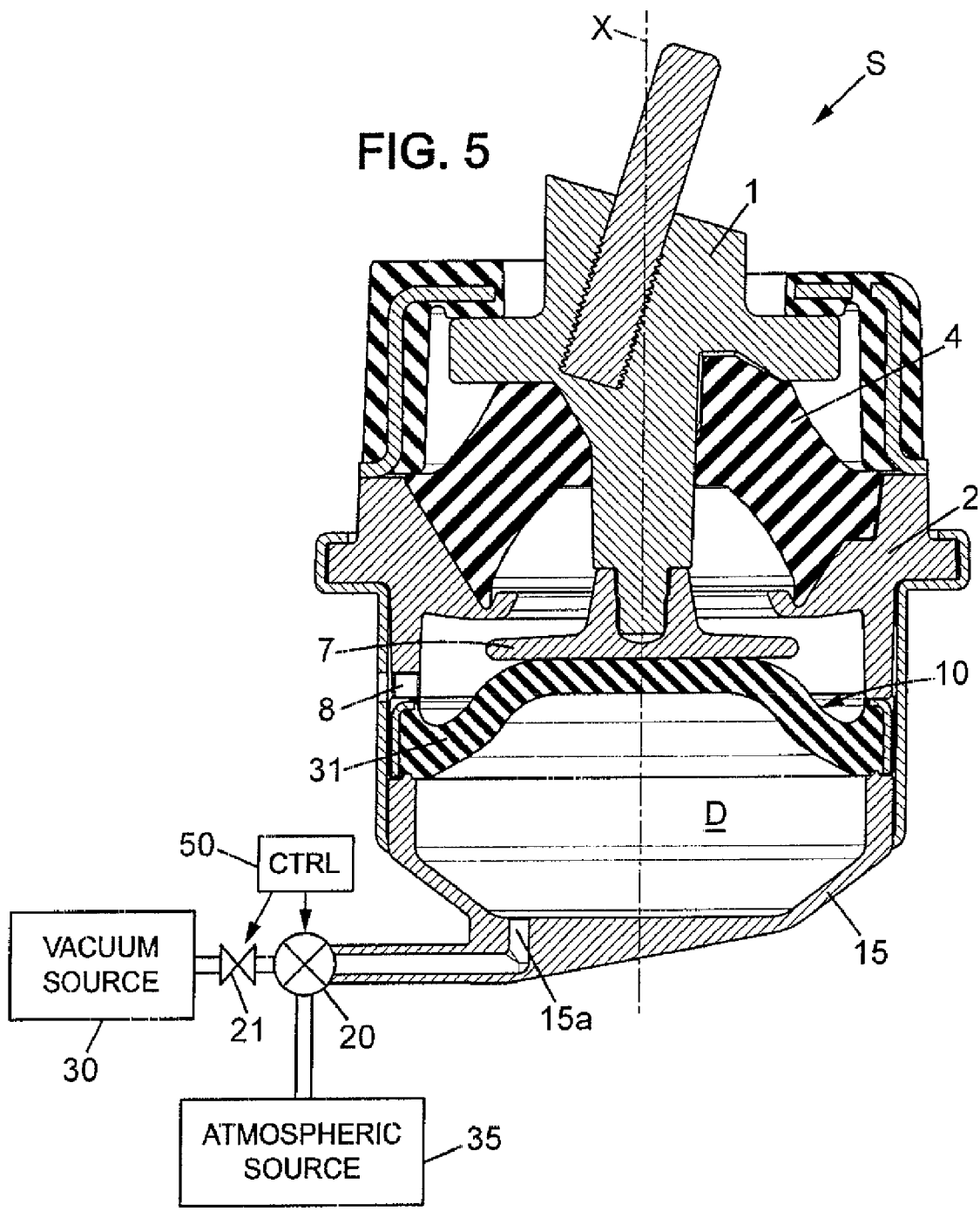

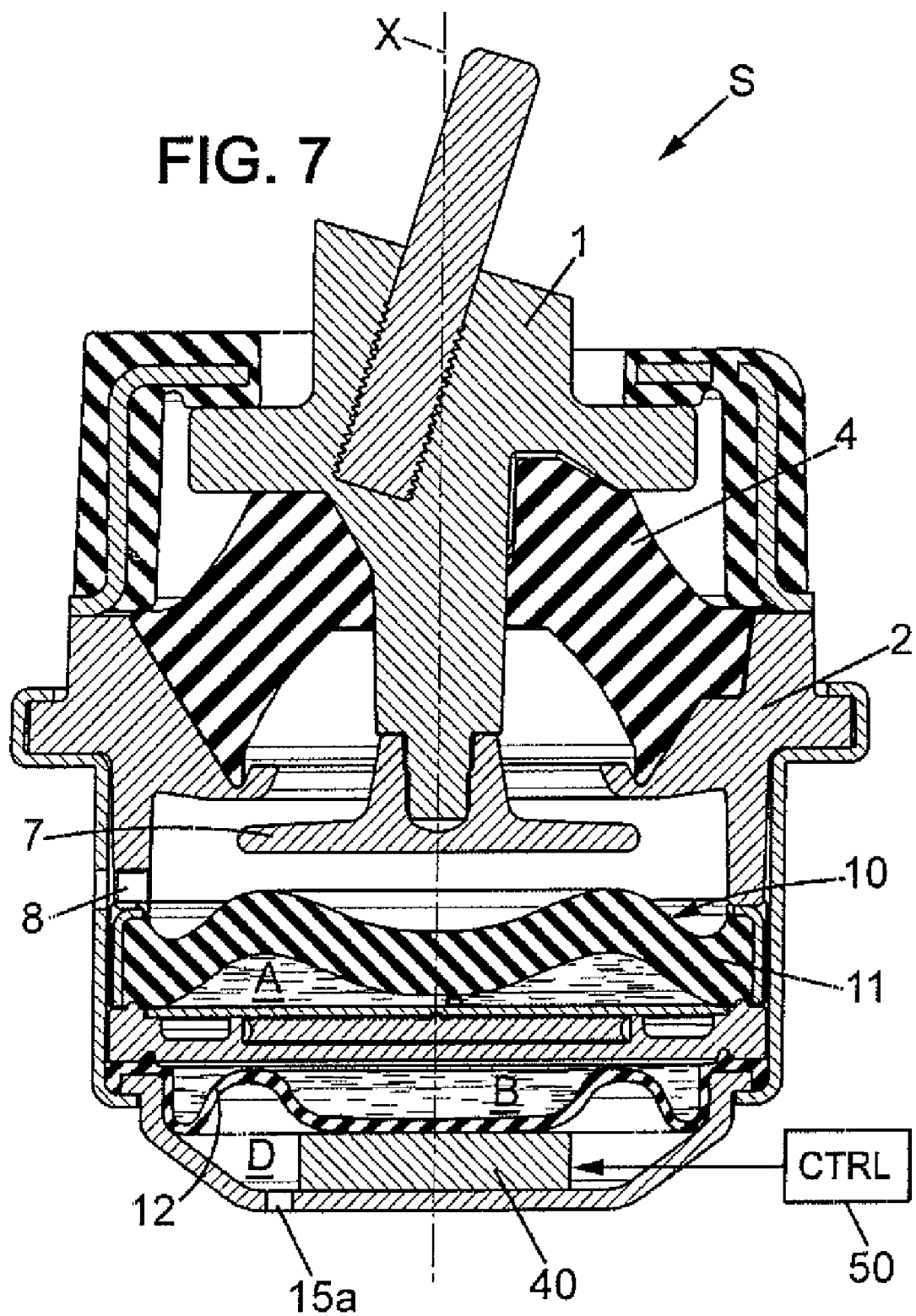

ANTIVIBRATION DEVICE, AND VEHICLE COMPRISING SAME

FIELD OF THE DISCLOSURE

The present disclosure relates to antivibration devices and to vehicles comprising such devices. More particularly, the disclosure relates to antivibration devices disposed for supporting loads and damping vibration between two external elements.

BACKGROUND OF THE DISCLOSURE

Known antivibration devices typically comprise means for attaching to external elements, for instance between a vehicle chassis and its engine, and at least one damping means for supporting loads and damping vibration imparted therebetween.

With these types of antivibration devices, it is usually desirable to minimise the stiffness and damping in order to, in automotive applications for example, improve passenger comfort during certain operational and environmental events requiring isolation of vibrations of relatively high frequency, such as engine idling.

However, other operational and environmental events require high stiffness and damping, for example during engine cruise conditions, where the vibrations to be treated are mostly of low frequency and large amplitude due to the uneven surface of the road.

Conventional antivibration devices are not adapted to suitably damp multiple events as a stiff device is not desirable for vehicle conditions requiring high isolation and a relatively soft device is not desirable for vehicle conditions requiring motion control: the result is thus usually a compromise of all performance parameters.

Document U.S. Pat. No. 6,386,527 discloses a hydraulic antivibration device able to efficiently control stiffness and damping at specific frequencies using fluid resonance effects through constricted passages.

While this adequately addresses operation at the resonant frequency, it produces a sometimes undesirable increase in dynamic stiffness for frequencies above the resonant frequency

SUMMARY OF THE DISCLOSURE

According to the disclosure, there is provided an antivibration device disposed for supporting loads and damping vibration between two external elements, comprising:
  first and second rigid members for securing respectively to each of said external elements;
  a resilient body connecting together said first and second rigid members and being disposed for at least partially supporting said loads and at least partially damping said vibrations;
  a damping unit for further partially damping said vibrations coincidentally with said resilient body, comprising at least one flexible wall;
  a pushing member connected to said first rigid member for driving said flexible wall in order to transfer loads and vibrations to said damping unit; and
  an inhibitor apparatus operable to drive the damping unit between:
    a first position in which the flexible wall is sufficiently close to the pushing member to be pushed by said pushing member when said first rigid member is moved in a direction corresponding to a compression of the resilient body, whereby said pushing member is thus able to transfer loads and vibrations to said damping unit, and
    a second position in which the flexible wall is sufficiently distant from the pushing member to not be pushed by said pushing member when said first rigid member is moved in a direction corresponding to a compression of the resilient body, whereby said pushing member is thus unable to transfer any loads and vibrations to said damping unit.

Such features allow the use of high stiffness using the combined stiffness and damping of the resilient body and damping unit, as well as the ability to disable the damping unit in order to provide low stiffness using only the resilient body.

Thus, with the use of the present antivibration device, one is able to provide in a single device, low stiffness for a broad frequency range in a first mode of operation, and higher stiffness for other predetermined frequencies in another mode of operation.

In various embodiments and variants, one may also use one or more of the following features:
  the pushing member comprises a piston member rigidly connected to the first rigid member;
  the damping unit comprises:
    a first and a second flexible wall sealingly connected together to define a sealed interior volume filled with fluid,
    a dividing element delimiting said interior volume into a working chamber and a compensation chamber, and
    a constricted passage permitting fluidic communication between said working chamber and compensation chamber;
  at least one of said flexible walls is resilient so as to present a particular stiffness beyond that offered by said constricted passage;
  the damping unit comprises a resilient member;
  the resilient body presents a central opening, the first rigid member traversing said central opening such that the resilient body encircles said first rigid member;
  the resilient body is frustoconically shaped, preferably hollow frustoconically shaped;
  the piston member contacts the damping unit;
  the resilient body is composed of a silicone compound;
  the resilient body is composed of a natural rubber compound;
  the inhibitor apparatus comprises a negative pressure source, preferably a vacuum pressure source;
  further comprises a protective shell cooperating with the damping unit to define a pneumatic chamber, said pneumatic chamber being fluidically connected to the inhibitor apparatus, whereby said inhibitor apparatus is a negative pressure source, preferably a vacuum source;
  the inhibitor apparatus comprises an electromechanical device; and
  the inhibitor apparatus comprises an electromechanical device connected to the damping unit and to a fixed portion of said antivibration device in such a way that when said electromechanical device is operated, said electromechanical device mechanically contracts to converge said damping unit to said fixed portion.

According to another aspect, a vehicle comprises a vehicle chassis supporting a vehicle engine via the above antivibration device; and a control device mounted in said vehicle independently of the antivibration device, adapted to selectively operate said inhibitor apparatus between the first and the second position

BRIEF DESCRIPTION OF THE DRAWINGS

Other characteristics and advantages will readily appear from the following description of various embodiments, provided as non-limiting examples, and of the accompanying drawings.

On the drawings:

FIG. 5 is a cross section of a second embodiment according to the present invention, illustrated in a first operational mode;

FIG. 6b is a detailed exemplary embodiment of the inhibitor apparatus of FIG. 6a; and FIG. 7 is the same embodiment as represented in FIG. 6, illustrated in a second operational mode.

On the different figures, the same reference signs designate like or similar elements.

DETAILED DESCRIPTION

Figure 1:
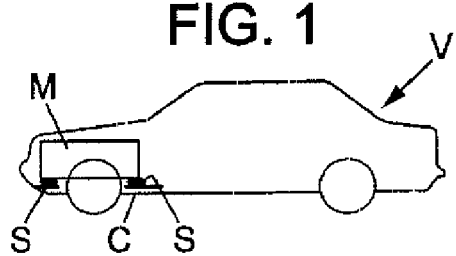
FIG. 1 illustrates a vehicle comprising an antivibration device according to the invention.

FIG. 1 illustrates a motor vehicle V comprising a vehicle chassis C and a vehicle engine M, between which is interposed at least one antivibration mount S according to the present invention.

Figure 2:
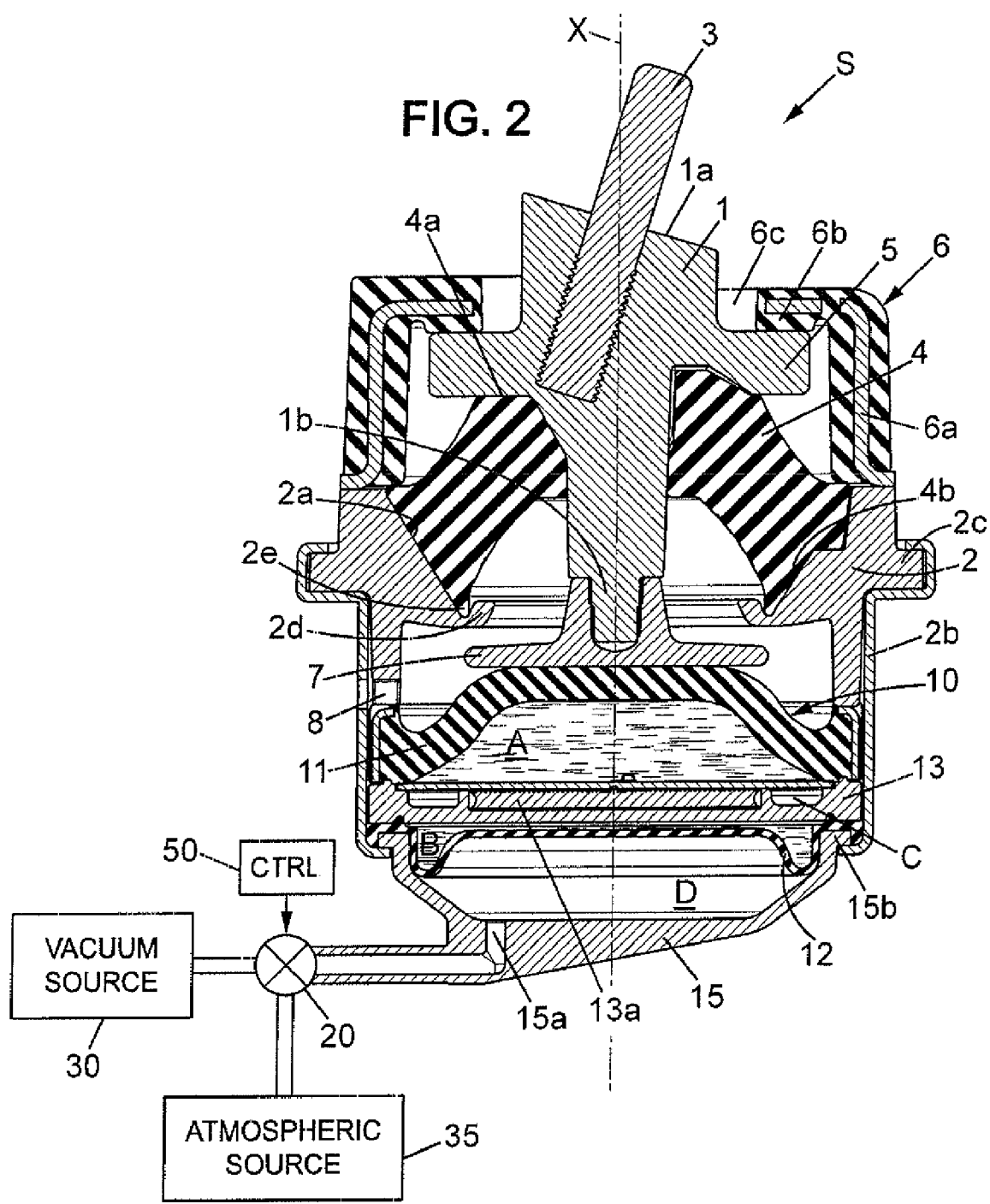
FIG. 2 is a cross section of a first embodiment according to the present invention, illustrated in a first operational mode.
Figure 3:
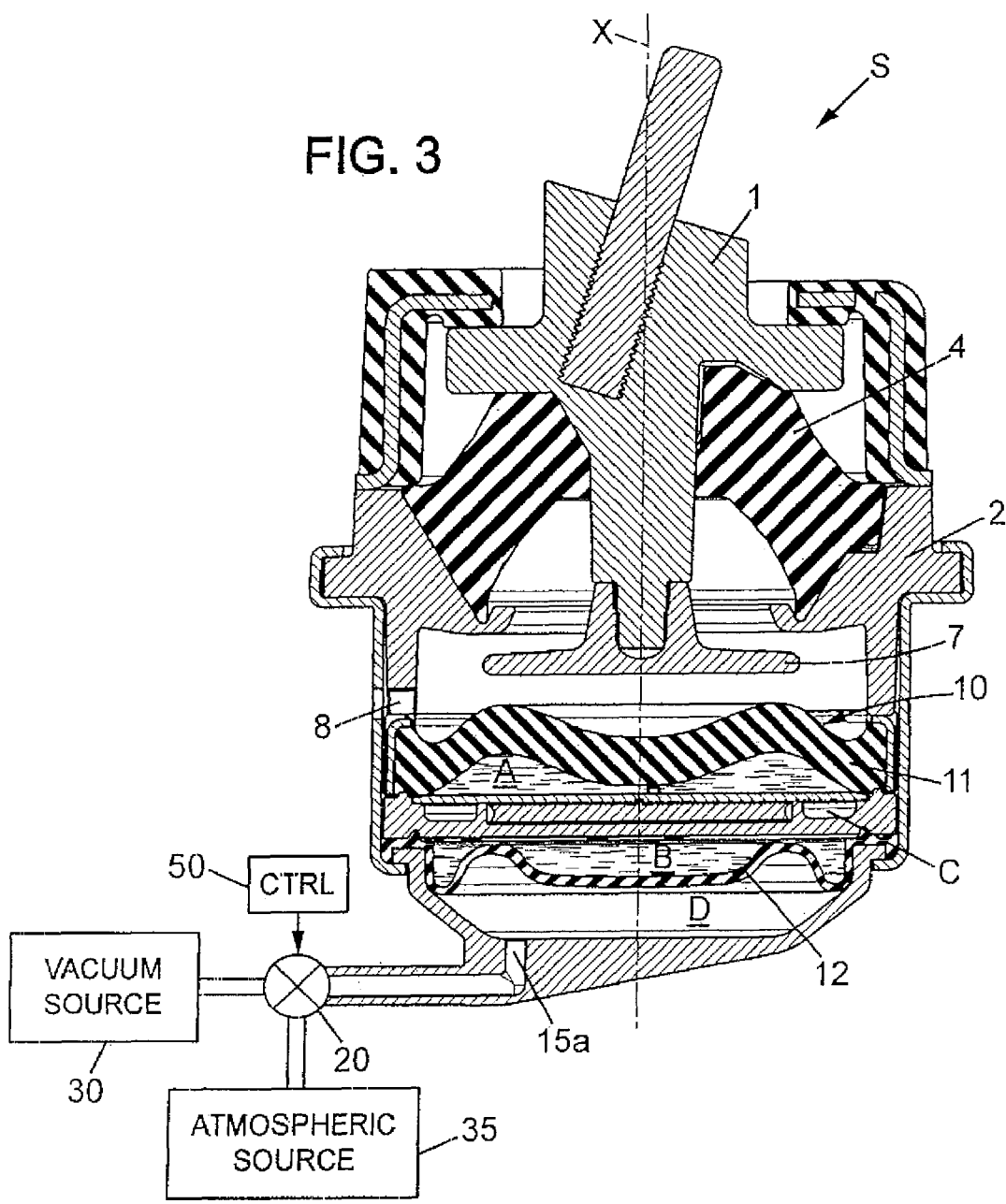
FIG. 3 is the same embodiment as represented in FIG. 2, illustrated in a second operational mode.

FIG. 2 illustrates a cross-sectional view of such an antivibration mount S according to a first embodiment of the invention.

The antivibration mount comprises a first rigid member 1 and an annular second rigid member 2 disposed for securing to respective external elements, for instance between the vehicle engine M and the vehicle chassis C in older to support static loads and dampen vibrations therebetween.

The first rigid member 1 extends substantially longitudinally along a central, vertically extending, axis X between an upper portion 1a and a lower portion 1b.

A threaded stud 3 is fitted into a threaded bore disposed in the upper portion 1a of the first rigid member 1 for securing to one of said external elements, for example the engine M.

A first damping element, in the form of a resilient first working element 4, such as an elastomer body (eg. made out of "natural" rubber or silicone rubber), links the first and second rigid members 1, 2, and provides the principle means by which loads are supported, and the vibrations attenuated or damped, between the first and second rigid members, and in consequence between the respective external elements.

The working element 4 presents a substantially annular frusto-conical or bell-shaped volume extending along central axis X between a first extremity 4a in contact with the first rigid member 1, and a second extremity 4b in contact with the second rigid member 2 The working element 4 is adhered and overmolded to the respective first and second rigid members 1, 2, and preferably to an overhanging lip 5 disposed circumferentially on the first rigid member 1, and to a bevelled internal face 2a of the second rigid member 2.

The bottom edge of the bevelled face 2a of the second rigid member 2 comprises a protruding lip 2d, thus defining a groove 2e therewith. In a variant of the present embodiment, the working element 4 may simply be interposed and held in position (with no adhesion) between the overhanging lip 5 and the bevelled face 2a. The groove 2e and the overhanging lip 5 are disposed to prevent slippage and dislocation of the working element 4 during operation A movement limiting casing 6, centred on axis X, is fitted to the second rigid member 2 and presents a substantially inverse cup-shaped structure disposed with a central through-hole 6c allowing the first rigid member 1 to pass therethrough. The circumferential portion of the casing defining the through-hole 6c provides an abutment zone 6b destined to come into contact with the lip 5.

Thereby, during operational events involving large amplitudes being applied to the antivibration device, the abutment zone 6b comes into abutment with the lip 5 to limit large relative longitudinal displacements between the first and second rigid members 1, 2, which would otherwise tense the working element 4 to the point where it could dissociate itself from one or another of the rigid member 1, 2, or deteriorate its mechanical properties and working life.

A damping unit 10 is centred on axis X, and positioned below the working element 4, rigidly braced against the second rigid member 2. A pressure-regulating port 8 is provided through the second rigid member 2 to provide communication between the atmosphere and the cavity of variable volume defined between the resilient working element 4, the damping unit 10, and the second rigid member 2.

The damping unit 10 is therefore an independent module.

The damping unit 10 is in mechanical working contact with the first rigid member 1 via a motion transmission element 7 forming a piston-shaped structure with the first rigid member 1, such that all loads, vibrations, and other stimuli imparted to the first working element 4 are imparted coincidentally and concurrently to the damping unit 10.

The motion transmission element 7 is a piston- or disc-like element fixed (eg. threaded) onto the lower portion 1b of the first rigid member 1, presenting a relatively large flat lower surface for evenly transferring the loads and vibrations from the first rigid member 1 to the damping unit 10.

In the first embodiment of the invention, the damping unit 10 comprises a first and a second flexible wall 11, 12, defining a sealed internal volume filled with a fluid, such as glycol. This volume is separated by a dividing element 13 into a working chamber A and a compensation chamber B.

The dividing element 13 defines a constricted passage C, disposed for instance along the periphery of said dividing element, allowing fluidic communication between the working chamber A and the compensation chamber B. The dividing element may further include a decoupling valve 13a, as is well known in the art.

The illustrated embodiment of the damping unit 10 presents a relatively thick and resilient first flexible wall 11 destined to come into contact with the motion transmission element 7, and a relatively thin and flexible second flexible wall 12 operable for effortless deformation Thus, the resilient first flexible wall 11 exhibits a predetermined resiliency, beyond that offered by the hydraulics of the damping unit 10 generally.

The antivibration mount further comprises a cup-shaped protection cover 15 sealingly positioned under the damping unit 10, against the second flexible wall 12 to protect it from mechanical encounters. The cover 15 is fixed in place with a tubular collar 2b clasped to, on one end, an external peripheral lip 2c of the second rigid member 2, and on the other end, an edge 15b of the cover 15. It thus forms a rigidly connected ensemble consisting of the second rigid member 2, the damping unit 10, and the cover 15.

The cover 15 cooperates with the outside surface of the second flexible wall 12 to define a pneumatic chamber D. A coupling port 15a, formed in the wall of the protection cover 15, is connected via a duct to a three-way valve 20 The valve 20 is in turn connected to, for one part, a vacuum source 30, and, for another part, to the atmosphere or to an atmospheric pressure source 35.

The three-way valve 20 is advantageously constituted using a solenoid valve controlled by an electronic circuit 50, such as the vehicle's onboard computer. According to operational modes desired, or according to detected vibrational frequencies, the controller 50 actuates the valve 20 to fluidically connect the pneumatic chamber D with either of the vacuum source 30 or the atmospheric source 35

The operation of the antivibration mount, in a first mode of operation whereby the valve 20 is connected to the atmosphere or to an atmospheric pressure source 35, is as follows: when vibratory axial movements of relatively low frequency (e.g. lower than 20 Hz) and relatively high amplitude (e.g. higher than 1 mm) are applied between the first rigid member 1 and the second rigid member 2, the working element 4 flexes, causing, through stimulus from the motion transmission element 7 acting on the first flexible wall 11, the transfer of fluid in the damping unit 10 from the working chamber A into the compensation chamber B through the constricted passage C This movement of liquid damps the vibrations applied to the rigid members 1, 2, with a particular efficiency in the vicinity of the resonant frequency of the constricted passage C When vibratory axial movements of relatively high frequency (e.g. higher than 20 Hz) and relatively low amplitude (e.g. lower than 1 mm) are applied between the two rigid members 1, 2, these movements are filtered by the decoupling valve 13a, as it is well known in the art. Such hydraulic damping operation corresponds substantially to an antivibration mount as known in the art.

The skilled person in the art will understand the effects of changing the material, resiliency, and thickness of either of the working element 4 or the flexible walls 11, 12, or the length and cross-section of the constricted passage C, to tune such an antivibration mount to exhibit different dynamic response at selected frequency ranges. Such designs considerations are indeed well known.

This first operational mode presents relatively low dynamic stiffness below the resonant frequency of the damping unit 10, and an increased stiffness above the resonant frequency due to the hydraulic effects of the damping unit 10. The first operational mode will be selected by the electronic circuit 50 for instance when the engine is operated in normal driving conditions It, however, remains possible to inhibit operation of the damping unit 10 by decoupling the damping unit 10 sufficiently far enough away from the motion transmission element 7 such that loads and vibrations are absorbed and filtered solely by the resilient working element 4. This offers the opportunity of low stiffness/high isolation for frequencies above the resonant frequency of the constricted passage C Therefore, according to a second mode of operation, the valve 20 is switched to the vacuum source 30 which will induce the pneumatic chamber D to reduce in volume as a direct consequence and in direct relation to the vacuum pressure applied. The collapsing of chamber D will consequently force a volumetric increase in the volume of the compensation chamber B, which will result in a volumetric decrease in the volume of the working chamber A. This will decouple the first flexible wall 11 from the motion transmission element 7, preventing the motion transmission element 7 to transmit loads and vibrations, thus effectively disabling the damping unit 10. The second mode of operation will be selected by electronic circuit 50, for instance, when the engine is idling.

Operationally, under this second mode of operation, all loads and vibrations applied to the antivibration mount will be supported and damped solely by the resilient working element 4, according to its design properties and design operational parameters. This offers relatively low dynamic stiffness and high isolation, even above the resonant frequency of the constricted passage C.

Figure 4:
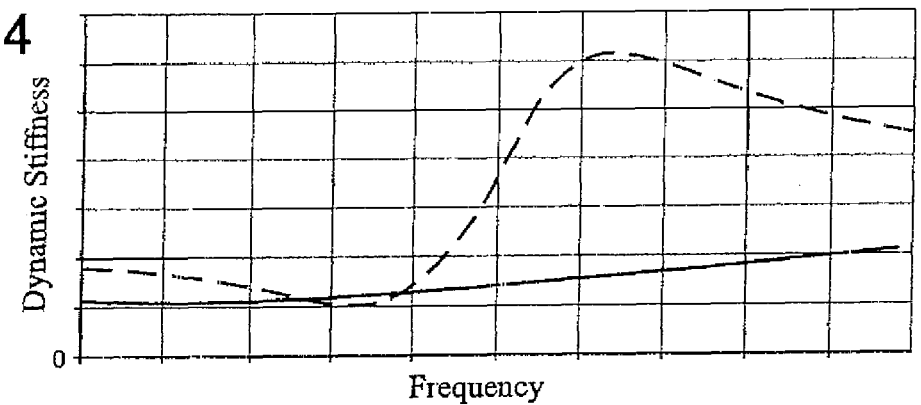
FIG. 4 illustrates a dynamic stiffness against frequency plot for a typical antivibration mount according to the invention.

The dynamic stiffness against frequency response plot is illustrated in FIG. 4 for the two above-mentioned modes of operation. The first operational mode is illustrated using a dashed line and shows the increased stiffness exhibited by the mount above the resonant frequency of the constricted passage C. The second operational mode is illustrated using a continuous line and shows the broad-frequency, low stiffness characteristic.

A second embodiment of the present invention is illustrated on FIG. 5, whereby the general damping unit 10 is a resilient working element 31 chosen to complement the first working element 4. All other elements apart from the damping unit 10 are identical or similar to those as presented in the first embodiment, unless specifically mentioned herebelow.

The cover 15 cooperates with the outside surface of the working element 31 to define the pneumatic chamber D. The cover 15 also defines a coupling port 15a which is connected via a duct to a three-way valve 20. The valve 20 is connected to a subsequent two-way (on/off) valve 21 and to an atmospheric pressure source 35 (eg. free atmosphere) The two-way valve 21 is connected to a vacuum source 30 (able to furnish vacuum pressure). Both the three-way valve 20 and the two-way valve 21 are controlled with controller 50.

Alternatively, in a non-illustrated variant of the present embodiment, a four-way valve may replace the series of valve 20 and valve 21.

The antivibration device S is illustrated on FIG. 5 in a first operational mode (corresponding broadly to the first operational mode of the first embodiment representing for instance normal driving conditions) whereby valve 21 is closed (preventing depressurisation of pneumatic chamber D) and valve 20 is switched to communicate with the atmospheric pressure source 35 This will result in pressure regulation of the pneumatic chamber D, especially if the pneumatic chamber D was previously voided by vacuum.

After the pneumatic chamber has equilibrized, the three-way valve 20 is now switched to communicate with two-way valve 21 (which remains closed). This results in the pneumatic chamber D being sealed and filled with a predetermined volume of compressible fluid (normally air) at atmospheric pressure.

In this configuration the working element 31 is near the piston 7, so that the loads and vibrations imparted between the rigid members 1, 2, will also be concurrently imparted to the second working element 31 by way of the motion transmission element 7 and will cause the second working element 31 to flex resiliently against the compressible pocket of air comprised in the pneumatic chamber D.

The resulting dynamic stiffness will be a function of the properties of the first working element 4, of the second working element 31, and of the fluid-filled chamber D.

The second embodiment further operates according to a second mode of operation (corresponding broadly to the second operational mode of the first embodiment representing for instance when the engine is idling), whereby the electronic circuit 50 switches the two-way valve 21 and the three-way valve to connect the pneumatic chamber D to the vacuum source 30. As a result of the depressurisation of pneumatic chamber D, the working element 31 decouples sufficiently from the motion transmission element 7 such that now all loads and vibrations are sustained solely by the working element 4.

Figure 6A:
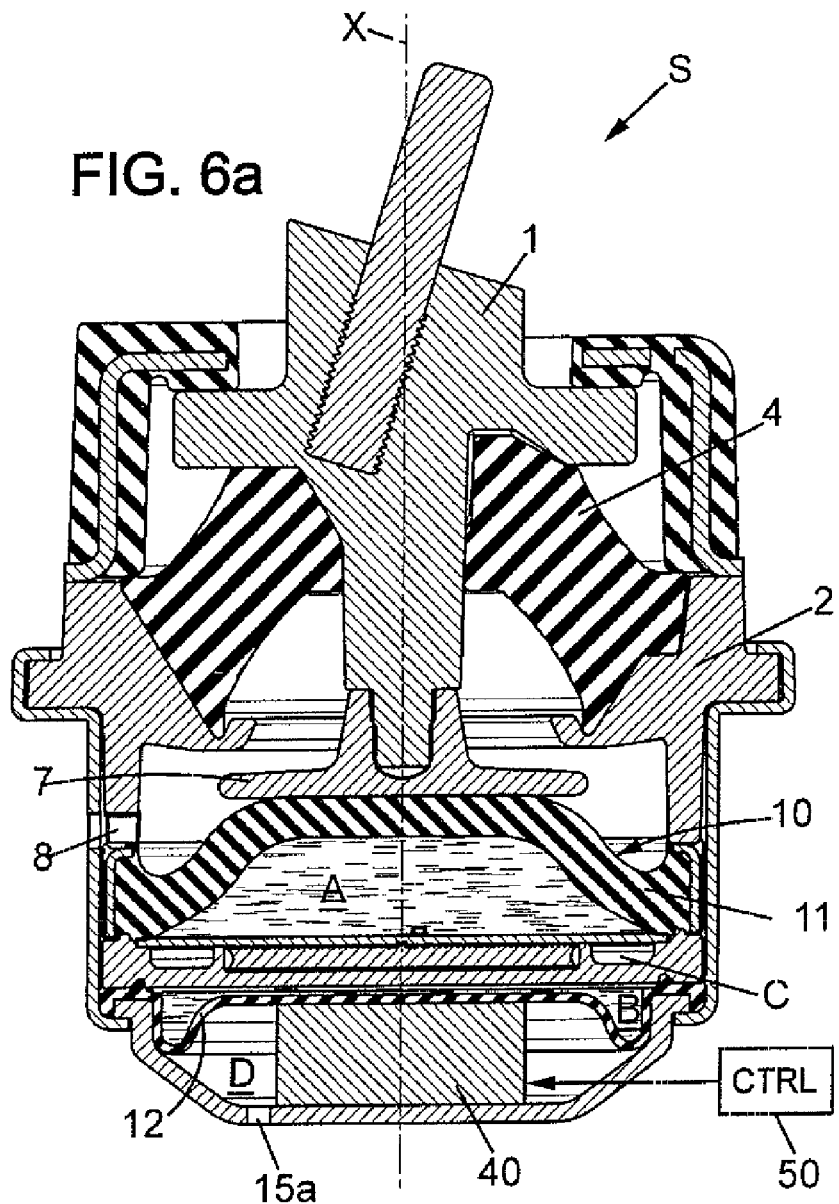
FIG. 6a is a cross section of a third embodiment according to the present invention, illustrated in a first operational mode.

According to a third embodiment of the present invention, illustrated on FIG. 6, the antivibration device S is identical or similar to that presented for the first embodiment, but uses different means of inhibiting the functioning of the damping unit 10. The presently illustrated damping unit 10 still uses hydraulic resonance in order to provide tuned stiffness at well defined frequencies.

In this embodiment, port 15a is simply a through-hole formed in the bottom of the cover 15 to provide pressure regulation for the chamber D. It is to be noted, therefore, that chamber D is no longer pneumatically linked to a vacuum source; indeed, it is simply a pressure regulation cavity connected to the atmosphere by a hole 15a in the cover 15

The third embodiment of the antivibration mount S comprises an electromechanical device 40 for inhibiting operation of the damping unit 10. It is controlled by an electronic circuit 50, such as the vehicle's onboard computers. According to operational modes desired, or as a function of detected vibrational frequencies, the onboard computer actuates the device 40 so as to inhibit operation of the damping unit 10, by decoupling the damping unit 10 from the motion transmission element 7.

The electromechanical device 40 may be any commonly known unit, for instance available off-the-shelf, which may be connected to the outside surface of the second flexible wall 12 and to the interior surface of the cover 15, and providing a collapsing function allowing the forced convergence of the cover 15 and the second flexible wall 12.

Figure 6B:
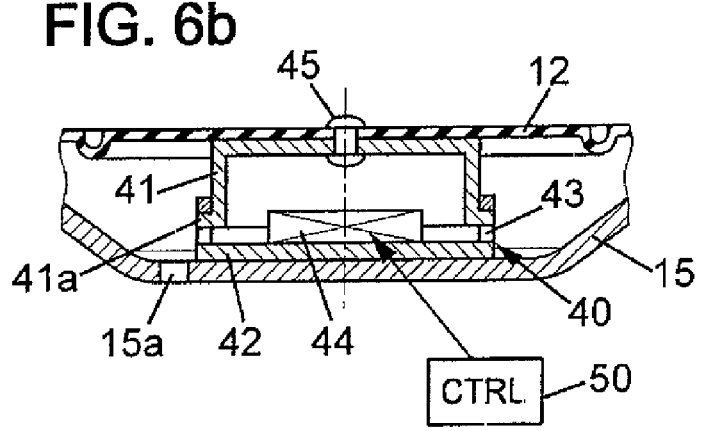

FIG. 6b illustrates in more detail an example of the electromechanical device 40.

In this example, the electromechanical device 40 comprises an upper reverse-cup-shaped shell member 41 having an overhang 41a at its end portion, slidably and frictionlessly mounted inside a hole 43 provided in the lateral wall of a lower cup-shaped shell member 42. The upper shell member 41 is fixed to the second flexible wall 12 of the damping unit 10 by use a rivet 45, although other fixation means such as adhesion can also be envisaged. The lower shell member 42 is fixed by adhesion to the protection cover 15.

An electromagnet 44 is provided on lower shell member 42, and is operable in a second operational mode to be selectively activated from controller 50, to magnetically draw the upper shell member 41 towards the lower shell member 42.

In all variants of the third embodiment, a control signal from the electronic circuit 50 actions the device 40 to contract or collapse upon itself, thus forcing the lower wall 12 towards the cover 15, in an analogous effect to previously described embodiments in which the pressure of the chamber is reduced, forcing the first flexible wall 11 to decouple from the motion transmission element 7. This state is illustrated in FIG. 7.

This results in a volumetric increase in the compensation chamber B of the damping unit 10, and a volumetric decrease in the working chamber A of the damping unit 10, thus resulting in a decoupling of the first flexible wall 11 of the damping unit 10 from the motion transmission element 7, in a similar manner as explained for the first embodiment.

Thus, according to the first mode of operation, analogous to the situation where the pneumatic chamber D of the first embodiment is connected to free atmosphere, the electromechanical device 40 is flee to move and provides no hindrance to the hydraulic compensation of the damping unit 10.

According to a second mode of operation, the electromechanical 40 unit pulls down the second flexible wall 12 (eg. the magnet 44 drawing closer the upper shell member 41), in a situation analogous to when the pneumatic chamber D of the first embodiment is connected to a vacuum source, thus forcing the damping unit 10 to decouple from the motion transmission element 7.

We claim:

1. An antivibration device disposed for supporting loads and damping vibration between two external elements, comprising:
   first and second rigid members for securing respectively to each of said external elements;
   a resilient body connecting together said first and second rigid members and being disposed for at least partially supporting said loads and at least partially damping said vibrations;
   a damping unit for further partially damping said vibrations coincidentally with said resilient body, comprising at least one flexible wall fixed to said second rigid member;
   a solid pushing member rigidly fixed to said first rigid member for pushing said flexible wall in order to transfer loads and vibrations to said damping unit; and
   an inhibitor apparatus operable to drive the damping unit between:
      a first position in which the flexible wall is sufficiently close to the pushing member to be pushed by said pushing member when said first rigid member is moved in a direction corresponding to a compression of the resilient body, whereby said pushing member is thus able to transfer loads and vibrations to said damping unit, and
      a second position in which the flexible wall is sufficiently distant from the pushing member to not be pushed by said pushing member when said first rigid member is moved in a direction corresponding to a compression of the resilient body, whereby said pushing member is thus unable to transfer any loads and vibrations to said damping unit.

2. An antivibration device according to claim 1, wherein the pushing member comprises a piston member rigidly connected to the first rigid member.

3. An antivibration device disposed for supporting loads and damping vibration between two external elements, comprising:
   first and second rigid members for securing respectively to each of said external elements;
   a resilient body connecting together said first and second rigid members and being disposed for at least partially supporting said loads and at least partially damping said vibrations;
   a damping unit for further partially damping said vibrations coincidentally with said resilient body, comprising at least one flexible wall,
      said flexible wall and a second flexible wall sealingly connected together to define a sealed interior volume filled with fluid,
      a dividing element delimiting said interior volume into a working chamber and a compensation chamber limited respectively by said flexible wall and said second flexible wall, and
      a constricted passage permitting fluidic communication between said working chamber and compensation chamber;

a pushing member connected to said first rigid member for pushing said flexible wall in order to transfer loads and vibrations to said damping unit; and an inhibitor apparatus operable to drive the damping unit between:

a first position in which the flexible wall is sufficiently close to the pushing member to be pushed by said pushing member when said first rigid member is moved in a direction corresponding to a compression of the resilient body, whereby said pushing member is thus able to transfer loads and vibrations to said damping unit, and a second position in which the flexible wall is sufficiently distant from the pushing member to not be pushed by said pushing member when said first rigid member is moved in a direction corresponding to a compression of the resilient body, whereby said pushing member is thus unable to transfer any loads and vibrations to said damping unit.

4. An antivibration device according to claim 3, wherein at least one of said flexible wall and said second flexible wall is resilient so as to present a particular stiffness beyond that offered by said constricted passage.

5. An antivibration device according to claim 1, wherein the damping unit comprises a resilient member.

6. An antivibration device according to claim 1, wherein the resilient body presents a central opening, the first rigid member traversing said central opening such that the resilient body encircles said first rigid member.

7. An antivibration device according to claim 1, wherein the resilient body is frustoconically shaped, preferably hollow frusto-conically shaped.

8. An antivibration device according to claims 1, wherein the pushing member contacts the damping unit.

9. An antivibration device according to claim 1, wherein the resilient body is composed of a silicone compound.

10. An antivibration device according to claim 1, wherein the resilient body is composed of a natural rubber compound.

11. An antivibration device according to claim 1, wherein the inhibitor apparatus comprises a negative pressure source, preferably a vacuum pressure source.

12. An antivibration device according to claim 1, further comprising a protective shell cooperating with the damping unit to define a pneumatic chamber, said pneumatic chamber being fluidically connected to the inhibitor apparatus, whereby said inhibitor apparatus is a negative pressure source, preferably a vacuum source.

13. An antivibration device according to claim 1, wherein the inhibitor apparatus comprises an electromechanical device.

14. An antivibration device according to claim 1, wherein the inhibitor apparatus comprises an electromechanical device connected to the damping unit and to a fixed portion of said antivibration device in such a way that when said electromechanical device is operated, said electromechanical device mechanically contracts to converge said damping unit to said fixed portion.

15. A vehicle comprising:

a vehicle chassis supporting a vehicle engine via an antivibration device, the antivibration device including:

first and second rigid members for securing respectively to each of said external elements;

a resilient body connecting together said first and second rigid members and being disposed for at least partially supporting said loads and at least partially damping said vibrations;

a damping unit for further partially damping said vibrations coincidentally with said resilient body, comprising at least one flexible wall fixed to said second rigid member;

a solid pushing member rigidly fixed to said first rigid member for pushing said flexible wall in order to transfer loads and vibrations to said damping unit; and an inhibitor apparatus operable to drive the damping unit between:

a first position in which the flexible wall is sufficiently close to the pushing member to be pushed by said pushing member when said first rigid member is moved in a direction corresponding to a compression of the resilient body, whereby said pushing member is thus able to transfer loads and vibrations to said damping unit, and a second position in which the flexible wall is sufficiently distant from the pushing member to not be pushed by said pushing member when said first rigid member is moved in a direction corresponding to a compression of the resilient body, whereby said pushing member is thus unable to transfer any loads and vibrations to said damping unit.

a control device mounted in said vehicle independently of the antivibration device, adapted to selectively operate said inhibitor apparatus between the first and the second position.

* * * * *